US010134527B2

(12) United States Patent
Asaoka et al.

(10) Patent No.: US 10,134,527 B2
(45) Date of Patent: *Nov. 20, 2018

(54) ELECTRONIC DEVICE, PIEZOELECTRIC DEVICE, LIQUID EJECTING HEAD, AND MANUFACTURING METHODS FOR ELECTRONIC DEVICE, PIEZOELECTRIC DEVICE, AND LIQUID EJECTING HEAD

(71) Applicant: SEIKO EPSON CORPORATION, Tokyo (JP)

(72) Inventors: Ichiro Asaoka, Suwa (JP); Koichi Morozumi, Shiojiri (JP); Masato Shimada, Chino (JP); Akira Kuriki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/807,060

(22) Filed: Nov. 8, 2017

(65) Prior Publication Data

US 2018/0065364 A1 Mar. 8, 2018

Related U.S. Application Data

(63) Continuation of application No. 15/614,889, filed on Jun. 6, 2017, now Pat. No. 9,840,077, which is a
(Continued)

(30) Foreign Application Priority Data

Aug. 25, 2015 (JP) .................................. 2015-165506

(51) Int. Cl.
*B41J 2/14* (2006.01)
*H01G 4/30* (2006.01)
(Continued)

(52) U.S. Cl.
CPC ............ *H01G 4/30* (2013.01); *B41J 2/14201* (2013.01); *B41J 2/14233* (2013.01); *B41J 2/161* (2013.01);
(Continued)

(58) Field of Classification Search
CPC .. B41J 2/14201; B41J 2/1607; B41J 2/14233; B41J 2/14271; B41J 2/14274; B41J 2/14209; B41J 2/14283; B41J 2/1626
See application file for complete search history.

(56) References Cited

U.S. PATENT DOCUMENTS 8,721,054 B2 5/2014 Hamada
8,789,927 B2* 7/2014 Yonemura ............. C04B 35/462
310/311
(Continued)

FOREIGN PATENT DOCUMENTS

| JP | 2014172392 | 9/2014 |
|---|---|---|
| JP | 2015074174 | 4/2015 |
| JP | 2015099864 | 5/2015 |

*Primary Examiner* — Juanita D Jackson
(74) *Attorney, Agent, or Firm* — Workman Nydegger

(57) ABSTRACT

An electronic device includes a capacitor that is configured with a first electrode layer, an insulating layer, and a second electrode layer being formed in the order listed herein. At least one end of the capacitor is defined by an end of the second electrode layer. The insulating layer is provided so as to extend to a non-element region that is on the outside of one end of the capacitor. The insulating layer under the non-element region is formed thinner than the insulating layer under the capacitor. A difference between the thickness of the insulating layer under the non-element region and the thickness of the insulating layer under the capacitor is equal to or less than 50 nm.

8 Claims, 4 Drawing Sheets

Related U.S. Application Data continuation of application No. 15/240,864, filed on Aug. 18, 2016, now Pat. No. 9,694,580.

(51) Int. Cl.
*H01G 4/40* (2006.01)
*H01G 2/02* (2006.01)
*H01G 4/228* (2006.01)
*B41J 2/16* (2006.01)
*H01G 4/12* (2006.01)

(52) U.S. Cl.
CPC ........... *B41J 2/1623* (2013.01); *B41J 2/1628* (2013.01); *B41J 2/1629* (2013.01); *B41J 2/1631* (2013.01); *H01G 2/02* (2013.01); *H01G 4/228* (2013.01); *H01G 4/40* (2013.01); *B41J 2002/14241* (2013.01); *H01G 4/1245* (2013.01)

(56) References Cited

U.S. PATENT DOCUMENTS

| | | |
|---|---|---|
| 9,022,533 B2 | 5/2015 | Yazaki et al. |
| 9,694,580 B2 | 7/2017 | Asaoka et al. |
| 9,840,077 B2 * | 12/2017 | Asaoka ................ B41J 2/14201 |
| 2014/0267511 A1 | 9/2014 | Yazaki et al. |
| 2015/0097898 A1 | 4/2015 | Hayashi |
| 2017/0266970 A1 | 9/2017 | Asaoka et al. |

* cited by examiner

ELECTRONIC DEVICE, PIEZOELECTRIC DEVICE, LIQUID EJECTING HEAD, AND MANUFACTURING METHODS FOR ELECTRONIC DEVICE, PIEZOELECTRIC DEVICE, AND LIQUID EJECTING HEAD

CROSS REFERENCES TO RELATED APPLICATIONS

This application is a continuation of U.S. application Ser. No. 15/614,889, filed Jun. 6, 2017 which is a continuation of U.S. application Ser. No. 15/240,864, filed Aug. 18, 2016, and issued as U.S. Pat. No. 9,694,580 on Jul. 4, 2017, which claims priority to Japanese Patent Application No: 2015-165506, filed Aug. 25, 2015, all of which are expressly incorporated by reference herein in their entireties.

BACKGROUND

1. Technical Field

The present invention relates to an electronic device that includes a first electrode layer, a second electrode layer and an insulating layer which is interposed between the first electrode layer and the second electrode layer, a piezoelectric device, a liquid ejecting head, and manufacturing methods for the electronic device, the piezoelectric device and the liquid ejecting head.

2. Related Art

An electronic device provided with a capacitor, such as a piezoelectric element and the like, in which an insulating layer is interposed between electrodes, has been used in a variety of apparatuses, sensors, or the like. For example, in a liquid ejecting apparatus, the piezoelectric element that is provided in the piezoelectric device, which is a type of the electronic device, is used to eject (discharge) a variety of liquids from a liquid ejecting head. The example of the liquid ejecting apparatus includes an image recording apparatus, such as an ink jet printer or an ink jet plotter. Recently, however, the liquid ejecting apparatus has also been applied to a variety of manufacturing apparatuses by taking advantage of a feature that allows an extremely small amount of liquid to be accurately targeted at a predetermined position. For example, the liquid ejecting apparatus is applied to a display manufacturing apparatus that manufactures a color filter of a liquid crystal display and the like, an electrode forming apparatus that forms an electrode an organic electroluminescent (EL) display, a field emission display (FED), and the like, and a chip manufacturing apparatus that manufactures a biochip (biochemical element). A recording head for the image recording apparatus ejects liquid ink, and a colorant ejecting head for the display manufacturing apparatus ejects solutions of respective colorants of red (R), green (G) and blue (B). In addition, an electrode material ejecting head for the electrode forming apparatus ejects liquid electrode materials, and a bioorganic material ejecting head for the chip manufacturing apparatus ejects solutions of liquid bioorganic materials.

The capacitor is formed by a lower electrode layer that is made of metal, a piezoelectric layer made of a piezoelectric body, such as lead zirconate titanate (PZT) and the like, and an upper electrode layer made of metal being sequentially stacked onto a substrate. Such a capacitor functions as the piezoelectric element, and the capacitor is bent and deformed once an electric field, which is generated due to the potential difference between both electrodes, is imparted between the lower electrode layer and the upper electrode layer. Each of the layers that configure such a piezoelectric element is formed, as in JP-A-2015-99864, for example, by etching being performed after each of the layers of metal or a piezoelectric body is made on the substrate, with a patterned resistant layer being used as a mask.

There are some piezoelectric elements in which one end of the lower electrode layer and one end of the piezoelectric layer are provided so as to extend to the outside of the upper electrode layer, and an end of the piezoelectric element is defined by the one end of the upper electrode layer. In such a configuration, at a time when removing the upper electrode layer that is in the outside of the piezoelectric element by etching, so-called over-etching, in which etching is continuously performed even after an amount that is equal to the thickness of the upper electrode layer has been removed, is performed to avoid a short circuit caused by the upper electrode layer not being completely removed. Accordingly, part of the piezoelectric layer is removed. However, if the part of the piezoelectric layer is removed excessively by the over-etching, damage to a boundary of the one end of the piezoelectric element is likely to occur. It is estimated that such damage can occur even at the end of the capacitor which is formed of a pair of upper and lower electrode layers and an insulating layer interposed therebetween.

SUMMARY

An advantage of some aspects of the invention is to provide an electronic device that includes a capacitor which is provided with a first electrode layer, an insulating layer, and a second electrode layer, and in which an end of the capacitor is defined by an end of the second electrode layer and damage to the end of the capacitor is prevented, a piezoelectric device, a liquid ejecting head, and manufacturing methods for the electronic device, the piezoelectric device and the liquid ejecting head.

According to an aspect of an invention, there is provided an electronic device including a capacitor that is configured with a first electrode layer, an insulating layer, and a second electrode layer being formed in the order listed herein. At least one end of the capacitor is defined by an end of the second electrode layer. The insulating layer is provided so as to extend to a non-element region that is on the outside of one end of the capacitor. The insulating layer under the non-element region is formed thinner than the insulating layer under the capacitor. A difference between the thickness of the insulating layer under the non-element region and the thickness of the insulating layer under the capacitor is equal to or less than 50 nm.

According to this configuration, it is possible to prevent the capacitor, that is, the end of the capacitor which is defined by the end of the second electrode layer, from being damaged by excessive over-etching. As a result, the reliability of the capacitor is improved, resulting in improved reliability of the electronic device.

According to another aspect of the invention, there is provided a piezoelectric device in which, in the electronic device of the above configuration, the insulating layer is a piezoelectric layer, and the capacitor is a piezoelectric element.

According to this configuration, it is possible to prevent the piezoelectric element, that is, an end of the piezoelectric element which is defined by an end of the second electrode layer, from being damaged by excessive over-etching. As a result, the reliability of the piezoelectric element is improved, resulting in improved reliability of the piezoelectric device.

According to still another aspect of the invention, there is provided a liquid ejecting head including: the piezoelectric device of the above configuration; a pressure chamber of which a volume is changed, following deformation of the piezoelectric element; and a nozzle that communicates with the pressure chamber.

According to this configuration, the reliability of the liquid ejecting head is improved.

According to still another aspect of the invention, there is provided a manufacturing method for an electronic device including a capacitor that is configured with a first electrode layer, an insulating layer, and a second electrode layer being formed in the order listed herein. The manufacturing method for an electronic device includes etching the second electrode layer to remove the second electrode layer and continuously etching the insulating layer in a non-element region that is on the outside of at least one end of the capacitor defined by an end of the second electrode layer generated by the etching of the second electrode layer even after the removal of the second electrode layer, such that the insulating layer under the non-element region is removed by 50 nm or less in a thickness direction.

According to this method, it is possible to manufacture, at a high yield rate, the capacitor in which damage to the end of the second electrode layer is prevented. That is, it is possible to efficiently manufacture the electronic device with improved reliability.

According to still another aspect of the invention, there is provided a manufacturing method for a piezoelectric device in which, in the aforementioned manufacturing method for an electronic device, the insulating layer is a piezoelectric layer, and the capacitor is a piezoelectric element.

According to this method, it is possible to manufacture, at a high yield rate, the piezoelectric element in which the damage to the end of the second electrode layer is prevented. That is, it is possible to efficiently manufacture the piezoelectric device with improved reliability.

According to still another aspect of the invention, there is provided a manufacturing method for a liquid ejecting head including: the aforementioned manufacturing method for a piezoelectric device; forming a pressure chamber of which a volume is changed, following deformation of the piezoelectric element; and forming a nozzle plate where a nozzle that communicates with the pressure chamber is formed.

According to this method, it is possible to efficiently manufacture the liquid ejecting head with improved reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the accompanying drawings. The embodiment below is described as if there are various limitations to the invention, but the following description is merely a preferable and specific example, and the scope of the invention is not limited to the forms described below insofar as there is no particular description to limit the spirit of the invention. An ink jet recording head (hereinafter, a recording head) that is a type of a liquid ejecting head provided with a piezoelectric device which is a type of an electronic device according to the invention, and an ink jet printer (hereinafter, a printer) that is a type of a liquid ejecting apparatus in which the ink jet recording head is mounted will be described as an example.

Figure 1:
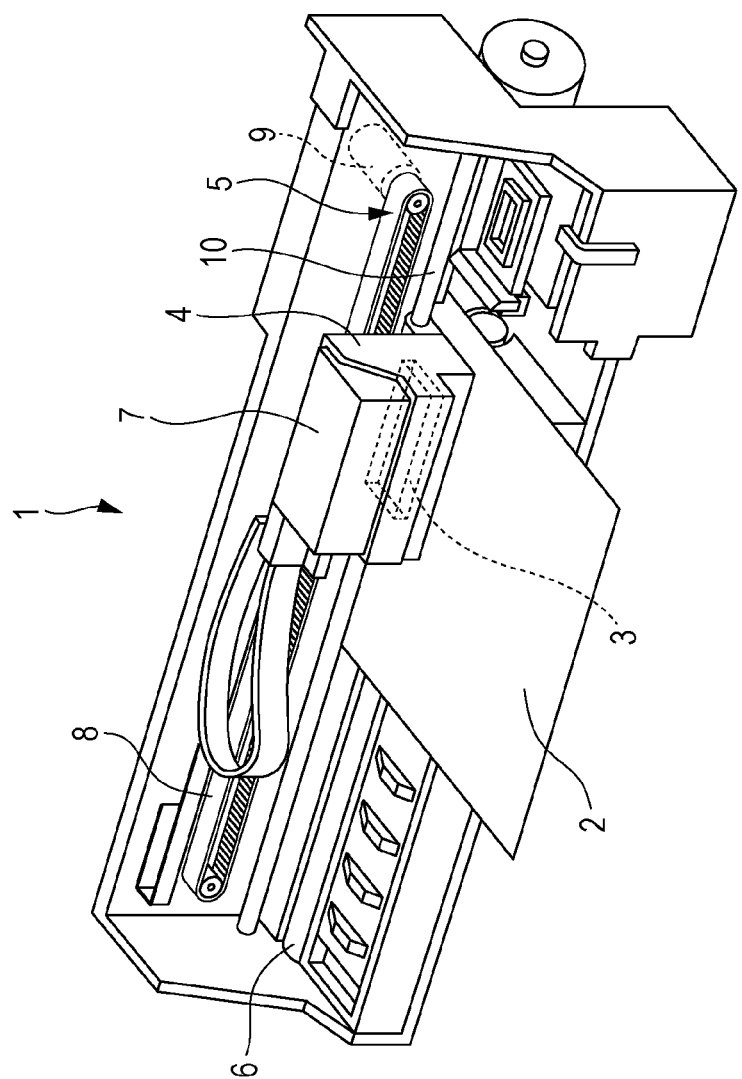
FIG. 1 is perspective view illustrating a configuration of a printer.

A configuration of a printer 1 will be described with reference to FIG. 1. The printer 1 is an apparatus that ejects ink (a type of liquid) with respect to a surface of a recording medium 2 (a type of targeted object), such as recording paper and the like, to record an image or the like. The printer 1 includes a recording head 3, a carriage 4 to which the recording head 3 is attached, a carriage moving mechanism 5 that moves the carriage 4 in a main scanning direction, and a transporting mechanism 6 that sends the recording medium 2 in a sub-scanning direction. The ink is stored in an ink cartridge 7 which is a source for liquid. The ink cartridge 7 is detachably mounted with respect to the recording head 3. A configuration in which an ink cartridge is disposed on a side of a printer main body and the ink is supplied through an ink supplying tube from the ink cartridge to a recording head can be adopted.

The carriage moving mechanism 5 is provided with a timing belt 8. The timing belt 8 is driven by a pulse motor 9, such as a DC motor and the like. Once the pulse motor 9 is operated, the carriage 4 reciprocates in the main scanning direction (in a width direction of the recording medium 2) after being guided by a guide rod 10 that is built into the printer 1. The position of the carriage 4 in the main scanning direction is detected by a linear encoder (not illustrated) that is a type of position information detecting means. The linear encoder transmits a detection signal, that is, an encoder pulse (a type of position information), to a control unit of the printer 1.

Figure 2:
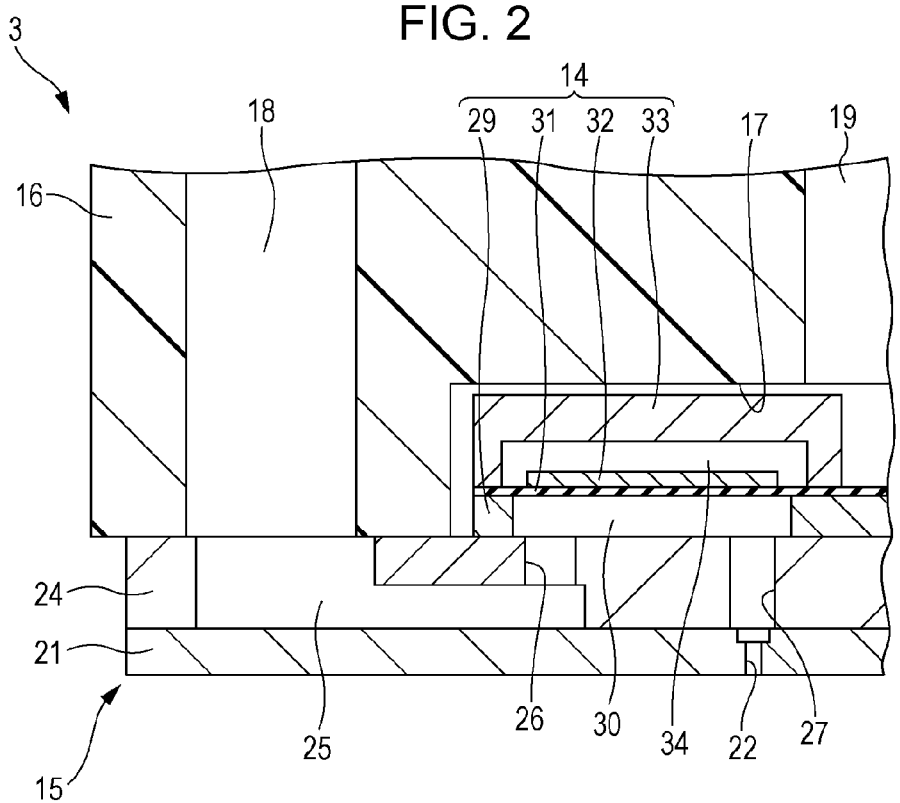
FIG. 2 is an enlarged sectional view of main parts of a recording head.
Figure 3:
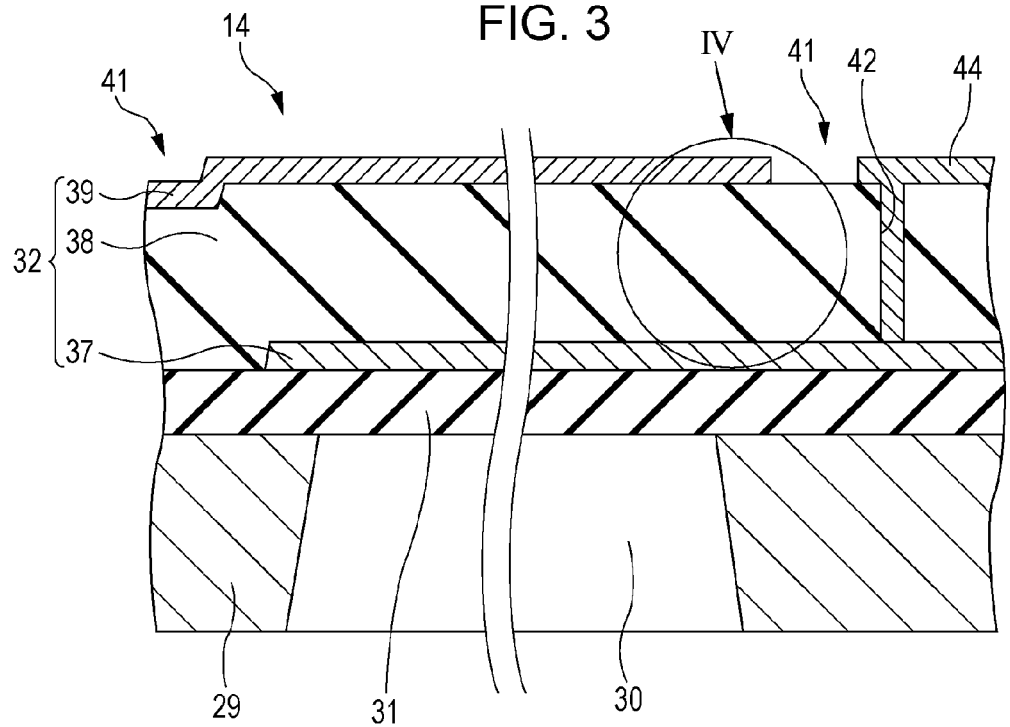
FIG. 3 is an enlarged sectional view of main parts of a piezoelectric device.
Figure 4:
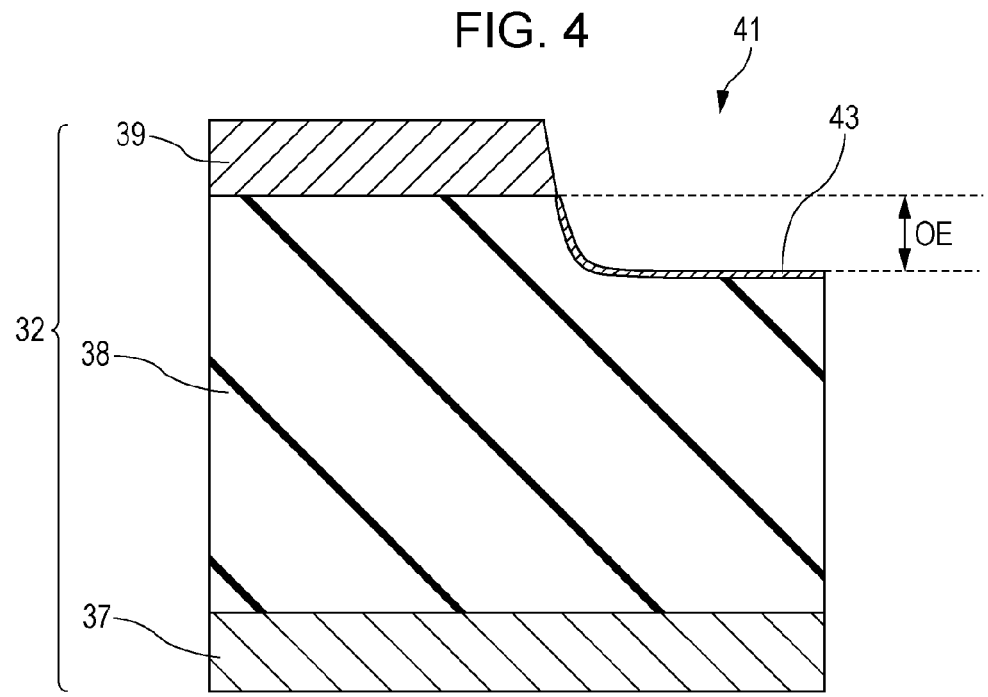
FIG. 4 is an enlarged sectional view of main parts of a piezoelectric element.

Hereinafter, the recording head 3 will be described. FIG. 2 is an enlarged sectional view of main parts of the recording head 3. FIG. 3 is an enlarged sectional view of main parts of a piezoelectric device 14 that is a type of electronic device. FIG. 4 is an enlarged sectional view of main parts of a piezoelectric element 32 that is a type of capacitor. In this embodiment, the recording head 3 is attached to a head case 16, in a state where the piezoelectric device 14 and a flow path unit 15 are stacked, as illustrated in FIG. 2. For convenience of description, a direction in which each member is stacked will be referred to as an up-and-down direction.

The head case 16 is a box-shaped member made of a synthetic resin, and a liquid introduction path 18 is formed in the head case 16. The liquid introduction path 18, just as a common liquid chamber 25 that will be described later, is a space where ink common to a plurality of pressure chambers 30 that are arranged in parallel is stored. An upper end of the liquid introduction path 18 communicates with the ink cartridge 7 via a liquid path (not illustrated). At a lower end of the head case 16, there is a housing space 17 for housing the piezoelectric device 14. Once the flow path unit 15 is bonded in a state of being positioned below a lower surface of the head case 16, the piezoelectric device 14 that is stacked on the flow path unit 15 (communication substrate 24) is housed in the housing space 17. Inside the head case 16, a penetration space 19 that penetrates the head case 16 in a height direction of the head case 16 is formed. A wiring member such as a flexible cable (not illustrated) that supplies a drive signal to the piezoelectric element 32 is disposed in the penetration space 19.

The flow path unit 15 includes a nozzle plate 21 in which a plurality of nozzles 22 are installed in a column-shape, and the communication substrate 24 in which the common liquid chamber 25 or the like is provided. The plurality of nozzles 22, from the nozzle 22 on one end to the nozzle 22 on the other end, which are installed in a column-shape (nozzle column), are provided at regular intervals, that is, at a pitch corresponding to a dot formation density. The common liquid chamber 25 is a flow path common to the plurality of pressure chambers 30, and is formed to have a large length in a direction of the pressure chambers 30 that are being arranged in parallel. Each of the pressure chambers 30 communicates with the common liquid chamber 25 via an individual communication path 26 that is formed in the communication substrate 24. In other words, the ink in the common liquid chamber 25 is distributed to each of the pressure chambers 30 via the individual communication path 26. The nozzle 22 communicates with the corresponding pressure chamber 30 via a nozzle communication path 27 that has penetrated the communication substrate 24 in a thickness direction thereof.

In the embodiment, the piezoelectric device 14 is an electronic device formed by a pressure chamber formation substrate 29, a diaphragm 31, the piezoelectric element 32 and a sealing plate 33 being stacked so as to be made as a single unit, as illustrated in FIGS. 2 and 3. The piezoelectric device 14 has a size that allows it to be housed in the housing space 17. Hence, the piezoelectric device 14 is housed in the housing space 17.

The pressure chamber formation substrate 29 is a hard plate made of silicon, and in this embodiment, the pressure chamber formation substrate 29 is formed of a silicon single substrate of which surfaces (upper surface and lower surface) have a plane orientation of (110) plane. In the pressure chamber formation substrate 29, a plurality of spaces that should become the pressure chambers 30, which are formed by completely removing parts of the pressure chamber formation substrate 29 by etching in the thickness direction thereof, are arranged in parallel in a nozzle column direction. The lower sides of these spaces are partitioned by the communication substrate 24, and the upper sides are partitioned by the diaphragm 31, thereby forming the pressure chambers 30. These spaces, that is, the pressure chambers 30, are long in a direction orthogonal to the nozzle column direction. In addition, one end of each of the pressure chambers 30 in a longitudinal direction communicates with the individual communication path 26, and the other end communicates with the nozzle communication path 27.

The diaphragm 31 is an elastic film-like member, and is stacked on the upper surface (surface on a side opposite to a communication substrate 24 side) of the pressure chamber formation substrate 29. The diaphragm 31 seals an upper opening of the space that should become the pressure chamber 30. In other words, the upper surface of the pressure chamber 30 is partitioned by the diaphragm 31. Part of the diaphragm 31 corresponding to the pressure chamber 30 (specifically, the upper opening of the pressure chamber 30) functions as a displacement portion that is displaced in a direction separating away from the nozzle 22 or in a direction approaching the nozzle 22, following bending deformation of the piezoelectric element 32. That is, a region of the diaphragm 31 corresponding to the upper opening of the pressure chamber 30 is a drive region that allows the bending deformation. The deformation (displacement) of the drive region (displacement portion) changes the volume of the pressure chamber 30. A region of the diaphragm 31 which is away from the upper opening of the pressure chamber 30 is a non-drive region where the bending deformation is inhibited.

The diaphragm 31 is made of, for example, a silicon dioxide ($SiO_2$) elastic film that is formed on the upper surface of the pressure chamber formation substrate 29, and a zirconium dioxide ($ZrO_2$) insulating film that is formed on the elastic film. The piezoelectric element 32 is stacked on a region (that is, the drive region) of the insulating film (surface of the diaphragm 31 on a side opposite to the pressure chamber formation substrate 29 side) corresponding to each of the pressure chambers 30. A configuration in which a pressure chamber formation substrate and a diaphragm are integrated with each other can be adopted. That is, a configuration can be adopted, in which etching processing is performed, to form a pressure chamber, on a lower surface of the pressure chamber formation substrate until a thin portion that has a small thickness is left on the upper surface, and the thin portion functions as the diaphragm.

In this embodiment, the piezoelectric element 32 is a piezoelectric element in a so-called bending mode. The plurality of piezoelectric elements 32 are arranged in parallel, corresponding to each of the nozzles 22, in the nozzle column direction. As illustrated in FIGS. 3 and 4, each of the piezoelectric elements 32 is formed, for example, by a lower electrode layer 37 (corresponding to a first electrode layer in the invention), a piezoelectric layer 38 that is a type of an insulating layer, and an upper electrode layer 39 (corresponding to a second electrode layer in the invention) being sequentially stacked on the diaphragm 31. In this embodiment, the lower electrode layer 37 functions as an individual electrode for each of the piezoelectric elements 32, and the upper electrode layer 39 functions as an electrode common to each of the piezoelectric elements 32. A configuration can be adopted, in which the functions of the lower electrode layer 37 and the upper electrode layer 39 are reversed depending on circumstances regarding a drive circuit or wiring. Once an electric field, which is generated due to the potential difference between both electrodes of the lower electrode layer 37 and the upper electrode layer 39, is imparted to the piezoelectric element 32 having such a configuration, the piezoelectric element 32 is bent and deformed in the direction separating away from the nozzle 22 or in the direction approaching the nozzle 22. That is, a region where the piezoelectric layer 38 is interposed between the lower electrode layer 37 and the upper electrode layer 39 is the piezoelectric element 32 which is driven by the drive signal.

As illustrated in FIG. 3, the piezoelectric layer 38 is provided so as to extend to the non-element region 41 that is on the outside of the region which is corresponding to the pressure chamber 30 in the direction orthogonal to the nozzle column direction and which will become the piezoelectric element 32. Specifically, one end of the piezoelectric layer 38 (left side in FIG. 3) is provided so as to extend beyond one end of the lower electrode layer 37 to an end of the pressure chamber formation substrate 29 in the direction orthogonal to the nozzle column direction. The other end of the piezoelectric layer 38 (right side in FIG. 3) is on the outside of the sealing plate 33 beyond the other end of the upper electrode layer 39, and is provided so as to extend to a terminal region (not illustrated) corresponding to the penetration space 19 of the head case 16, in the direction orthogonal to the nozzle column direction. In the piezoelectric layer 38 which is on the outside of the other end of the upper electrode layer 39, a contact hole 42 that penetrates the piezoelectric layer 38 in the thickness direction is formed. In this embodiment, the piezoelectric layer 38 is formed over the plurality of the piezoelectric elements 32 in the nozzle column direction, and an opening (not illustrated) is formed in a part corresponding to a region interposed between adjacent pressure chambers 30, that is, a part corresponding to the non-drive region between the nearby pressure chambers 30. This opening is a concave portion or a through-hole formed by removing a part of the piezoelectric layer 38, and extends along edges of the pressure chambers 30. That is, in a configuration where the opening is provided in such a manner, a beam-shaped piezoelectric layer 38 that is provided in a region corresponding to the pressure chamber 30, which is a part between adjacent openings in the nozzle column direction, and the upper and lower electrode layers 39 and 37, between which the piezoelectric layer 38 is interposed, functions as the piezoelectric element 32.

As illustrated in FIG. 3, the one end of the lower electrode layer 37 in the direction orthogonal to the nozzle column direction is formed on the inside of one end of the piezoelectric layer 38 and one end of the upper electrode layer 39 in the aforementioned direction. Accordingly, one end of the piezoelectric element 32 in the direction orthogonal to the nozzle column direction is defined by the one end of the lower electrode layer 37. In this embodiment, the one end of the lower electrode layer 37 is provided so as to extend to a side which is slightly outside the region corresponding to the pressure chamber 30. The other end of the lower electrode layer 37 in the direction orthogonal to the nozzle column direction is provided so as to extend beyond the other end of the upper electrode layer 39 to the non-element region 41 in the direction orthogonal to the nozzle column direction. A lead electrode layer 44 is connected, via the contact hole 42, to the lower electrode layer 37 which is on the outside of the other end of the upper electrode layer 39. The lead electrode layer 44 is provided so as to extend to the terminal region in the direction orthogonal to the nozzle column direction on the piezoelectric layer 38, and is connected to a terminal corresponding to the wiring member in the terminal region.

The upper electrode layer 39 is formed over the plurality of the piezoelectric elements 32 in the nozzle column direction. As illustrated in FIG. 3, the one end of the upper electrode layer 39 in the direction orthogonal to the nozzle column direction is provided so as to extend beyond the one end of the lower electrode layer 37 in the aforementioned direction to the end of the pressure chamber formation substrate 29. The other end of the upper electrode layer 39 in the direction orthogonal to the nozzle column direction is formed on a side which is slightly inside the other end of the lower electrode layer 37 and the piezoelectric layer 38 in the aforementioned direction. Accordingly, the other end of the piezoelectric element 32 in the direction orthogonal to the nozzle column direction is defined by the other end of the upper electrode layer 39. In this embodiment, the other end of the upper electrode layer 39 is provided so as to extend to a side which is slightly outside the region corresponding to the pressure chamber 30.

Platinum (Pt), iridium (Ir), gold (Au), nickel (Ni), copper (Cu), chromium (Cr), titanium (Ti), tungsten (W), tantalum (Ta), zirconium (Zr), oxides of these chemical elements, and electrically conductive oxides, including $LaNiO_3$, $SrTiO_3$, $InSnO_3$, and the like, are used in the lower electrode layer 37, the upper electrode layer 39, and the lead electrode layer 44. In this embodiment, iridium (Ir), titanium (Ti), platinum (Pt) and oxides of these chemical elements are used in the lower electrode layer 37, and iridium (Ir), titanium (Ti) and oxides of these chemical elements are used in the upper electrode layer 39. Solid solution of $Pb(Zr,Ti)O_3$, solid solution of $Pb(MnNb)O_3$—$PbTiO_3$, the solid solutions being added with trace amounts of metallic elements, and dielectrics that do not contain lead (Pb), such as solid solution of $Bi(FeMn)O_3$—$BaTiO_3$, solid solution of $K(NaNb)O_3$ and the like, are used in the piezoelectric layer 38. In this embodiment, $Pb_{1.1}(Zr_{0.5}Ti_{0.5})O_3$ are used in the piezoelectric layer 38. A substrate having a thickness of approximately 150 nm to 10 um can be used as the piezoelectric layer 38, depending on the purpose.

As illustrated in FIG. 4, the piezoelectric layer 38 under the non-element region 41 which is on the outside of the other end of the upper electrode layer 39 is formed thinner than the piezoelectric layer 38 under the piezoelectric element 32 by the upper electrode layer 39 being removed and by over-etching (etching which is performed continuously even after the removal of the upper electrode layer 39) being performed when the piezoelectric element 32 is present. That is, the piezoelectric layer 38 under the non-element region 41 has been dug by the over-etching. In this embodiment, a boundary surface of the piezoelectric layer 38 under the non-element region 41, which is on the piezoelectric element 32 side, is in a state of being inclined downward from the other end of the upper electrode layer 39 toward the outside. Regardless of the thickness of the piezoelectric layer 38 under the piezoelectric element 32 (the piezoelectric layer 38 in a state where the over-etching is not performed), a difference OE (amount of over-etching OE performed on the piezoelectric layer 38 under the non-element region 41) between the thickness (average value) of the piezoelectric layer 38 under the non-element region 41 and the thickness of the piezoelectric layer 38 under the piezoelectric element 32 is equal to or less than 50 nm. This will be described below in detail. In this embodiment, since the piezoelectric layer 38 is formed of the above-mentioned dielectric polycrystals, and the surface of the piezoelectric layer 38 is etched by dry etching, an amorphous damaged layer 43 is formed on the etched surface of the piezoelectric layer 38. It is preferable to ensure that the thickness of the damaged layer 43 does not exceed 30 nm.

In a case where the amount of the over-etching OE to be performed on the piezoelectric layer 38 under the non-element region 41 is set to zero, that is, in a case where the over-etching will not be performed on the piezoelectric layer 38, the upper electrode layer 39 might remain slightly on the piezoelectric layer 38. If the upper electrode layer 39 remains in a region where the upper electrode layer 39 should be removed, a short circuit might occur between the upper electrode layer 39 and a nearby piezoelectric element 32, the lead electrode layer 44, and other electrodes. In addition, damage that causes inhomogeneity of the upper electrode layer 39 becomes likely to occur. For this reason, it is necessary to perform the over-etching on the piezoelectric layer 38 under the non-element region 41, thereby reliably removing the upper electrode layer 39. However, it is known that the reliability of the piezoelectric layer 38 (piezoelectric element 32) decreases if the amount of over-etching OE is excessive.

Figure 5:
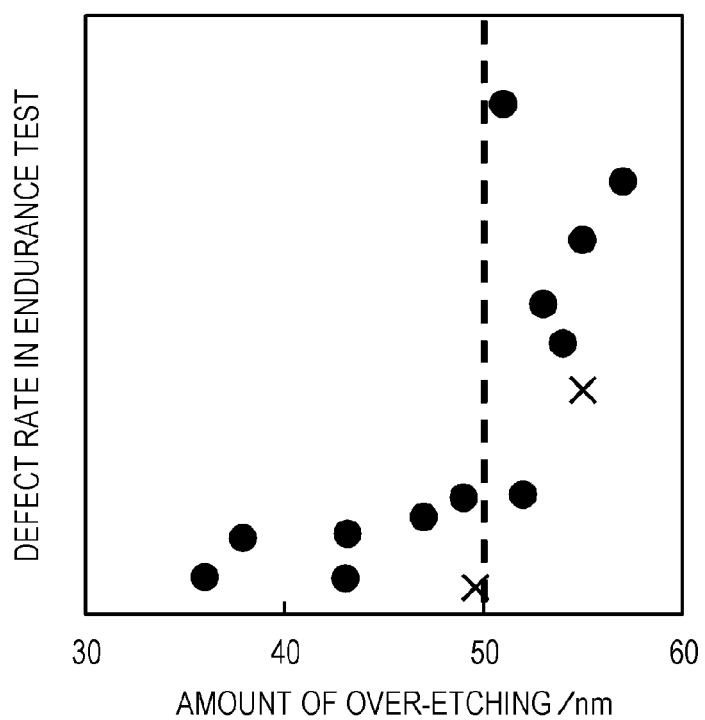
FIG. 5 is a graph illustrating a relationship between an amount of over-etching performed on a piezoelectric layer and a defect rate of the piezoelectric element.

FIG. 5 is a graph illustrating a relationship between an amount of over-etching OE performed on the piezoelectric layer 38 and a defect rate of the piezoelectric element 32 found in an endurance test. As illustrated in the graph, the horizontal axis represents amounts of over-etching OE (nm), and the vertical axis represents defect rates of the piezoelectric elements 32 found in the endurance test. A solid circle mark represents test results obtained when the thickness of the piezoelectric layer 38 under the piezoelectric element 32 (the piezoelectric layer 38 in a state where the over-etching was not performed) was set to 1300 nm, and a x mark represents test results obtained when the thickness of the piezoelectric layer 38 under the piezoelectric element 32 (the piezoelectric layer 38 in a state where the over-etching was not performed) was set to 750 nm. In this embodiment, in the endurance test of the piezoelectric element 32, an examination method was used, in which the piezoelectric element 32, which was in a state of being assembled into the recording head 3, discharged the ink 100 million times from the nozzles 22 by the use of a discharging waveform, to find if defects, including a discharge defect and the like, occur. In a case where an ink discharge defect caused by damage to the piezoelectric element 32 (piezoelectric layer 38) had occurred even once, the recording head 3 was counted as a defective recording head. The graph in FIG. 5 illustrates defect rates of the recording head 3. The maximum voltage of the discharging waveform that was used in the endurance test of the piezoelectric element 32 was adjusted such that the electric field of the same strength was applied to the piezoelectric element 32 which was interposed between the lower electrode layer 37 and the upper electrode layer 39 even in a case where the thickness of the piezoelectric layer 38 under the piezoelectric element 32 varied.

As illustrated in FIG. 5, it can be seen that the defect rate increased rapidly if the amount of over-etching OE exceeded 50 nm when the thickness of the piezoelectric layer 38 under the piezoelectric element 32 was set to 1300 nm. It can be also seen that the defect rate increased rapidly if the amount of over-etching OE exceeded 50 nm even when the thickness of the piezoelectric layer 38 under the piezoelectric element 32 was set to 750 nm. In other words, it can be seen that the defect rate increased rapidly if the amount of over-etching OE exceeded 50 nm regardless of the thickness of the piezoelectric layer 38 under the piezoelectric element 32. For this reason, it is preferable to set the amount of over-etching OE performed on the piezoelectric layer 38 under the non-element region 41 to 50 nm or less. By doing so, it is possible to prevent damage to the piezoelectric element 32 since the end of the piezoelectric element 32 is defined by the other end of the upper electrode layer 39. As a result, the reliability of the piezoelectric element 32 is improved, resulting in improved reliability of the piezoelectric device 14 and improved reliability of the recording head 3.

It is known that ink discharge defects occur by the piezoelectric layer 38 that is in a boundary between the piezoelectric element 32 and the non-element region 41 (the other end of the upper electrode layer 39) being damaged. It is estimated that this damage is caused by stress being concentrated on the piezoelectric layer 38 in the boundary between the piezoelectric element 32 and the non-element region 41, minute cracks being created in the piezoelectric layer 38 due to the generation of an electric field in the boundary, and electric current flowing in the minute cracks when moisture or the like has entered the minute cracks.

Since the minute cracks are created just by the over-etching being performed, it is estimated that similar damage occurs in the insulating layer that is interposed between the electrode layers. In other words, the damage might occur when the electric current flows in the minute cracks created by the over-etching even in a case where stress is not concentrated on a boundary between the insulating layer and the non-element region. It is estimated that rates of defects caused by damage to an end of a capacitor show a similar tendency illustrated in the graph of FIG. 5, even the capacitor is formed of a pair of upper and lower electrode layers and the insulating layer that is interposed therebetween, since the degree of the minute cracks varies depending on the amount of the over-etching.

Since the piezoelectric layer 38 is made of dielectric polycrystals, in this embodiment, slight unevenness is formed, due to crystal grains, on a surface of the piezoelectric layer 38 which is in a state where the over-etching is not performed. For this reason, a short circuit might occur between the upper electrode layer 39 that has filled the unevenness and other electrodes when the upper electrode layer 39 is not removed by the etching. It is preferable to have the amount of the over-etching OE performed on the piezoelectric layer 38 be larger than at least the arithmetic average roughness (Ra) of the surface of the piezoelectric layer 38 such that the short circuit is prevented. It is even more preferable to have the amount of over-etching OE performed on the piezoelectric layer 38 be larger than a mean roughness depth (Rz) of the surface of the piezoelectric layer 38, that is, a sum of a maximum peak height (Rp) and a maximum valley depth (Rv) such that the upper electrode layer 39 that has filled the unevenness of the surface of the piezoelectric layer 38 is reliably removed.

As illustrated in FIG. 2, the sealing plate 33 is a substrate in which a piezoelectric element housing space 34 that is capable of housing the piezoelectric element 32 is formed. The sealing plate 33 is bonded onto the diaphragm 31 in a state where the piezoelectric element 32 is housed in the piezoelectric element housing space 34. It is possible to adopt a sealing plate in a flat plate-like shape in which a piezoelectric element housing space is not formed. In this case, a space for housing the piezoelectric element is formed by having the thickness of adhesive that bonds a diaphragm and the sealing plate together be large, and by enclosing the surroundings of the piezoelectric element with the adhesive. It is also possible to adopt a sealing plate having a configuration in which a circuit and wiring, such as a drive circuit and the like, are provided in the sealing plate.

The recording head 3 that is formed in a manner described above introduces the ink from the ink cartridge 7 into the pressure chambers 30 via the liquid introduction path 18, the common liquid chamber 25, and the individual communication path 26. In this state, the drive signal from the control unit is supplied to the piezoelectric element 32 via the wiring member, thereby driving the piezoelectric element 32 to change the volumes of the pressure chambers 30. By the use of the changed volume and a subsequent pressure change, ink droplets are ejected from the nozzles 22 that communicate with the pressure chambers 30 via the nozzle communication path 27.

Figure 6A:
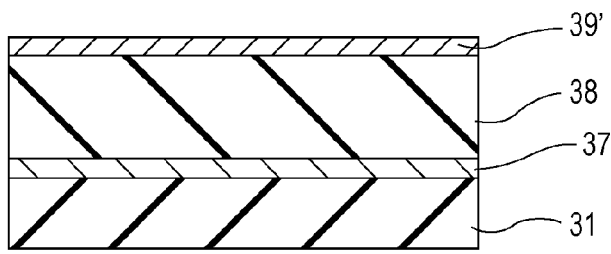
FIGS. 6A to 6D are sectional views illustrating a piezoelectric element manufacturing method.
Figure 6B:
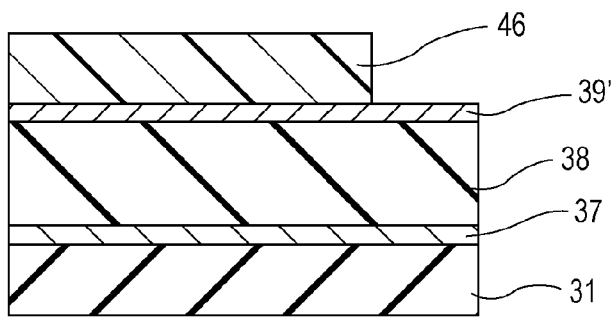
Figure 6C:
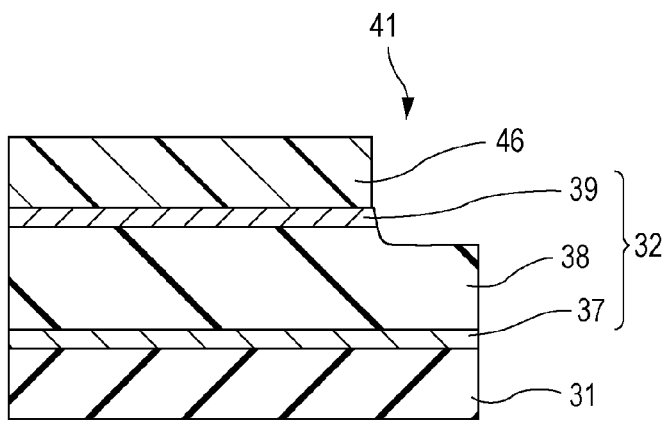

Hereinafter, a piezoelectric device 14 manufacturing step, specifically, a piezoelectric element 32 manufacturing step will be described. FIGS. 6A to 6D are state transition diagrams illustrating the piezoelectric element 32 manufacturing step in sections. First, the diaphragm 31 is stacked on an upper surface (surface opposing the sealing plate 33) of a silicon single crystal substrate that will become the pressure chamber formation substrate 29. Next, on the upper surface of the diaphragm 31, the lower electrode layer 37 and the piezoelectric layer 38 are patterned sequentially by semiconductor processes (that is, a film forming step, a photolithography step and an etching step, or the like). Once the piezoelectric layer 38 is patterned, a metal layer 39' that will become the upper electrode layer 39 is made over the upper surface of the diaphragm 31 in the film forming step as illustrated in FIG. 6A. Then, a resistant layer made of a photosensitive resin is applied onto the metal layer 39', the metal layer 39' is exposed and developed through a mask, and thereby a resistant layer 46 is patterned at a predetermined position (refer to FIG. 6B). In this state, the etching step is implemented, and the upper electrode layer 39, the lead electrode layer 44, and the like are formed. That is, as illustrated in FIG. 6C, unnecessary parts of the metal layer 39' are removed by the etching (dry etching, in this embodiment) with the patterned resistant layer 46 used as a mask.

Figure 6D:
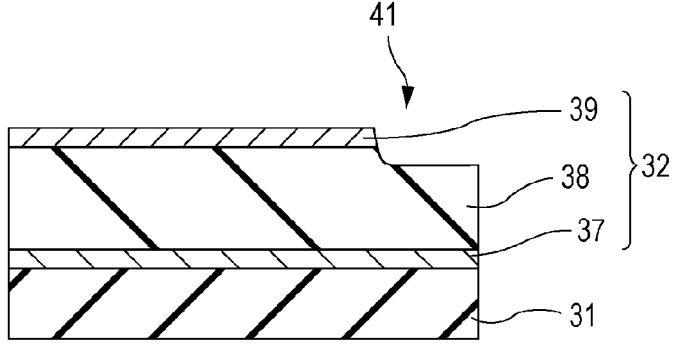

In the etching step, the piezoelectric layer 38 which is in a region where the resistant layer 46 is not stacked is removed by 50 nm or less in the thickness direction by so-called over-etching in which etching is continuously performed even after the removal of the upper electrode layer 39. In particular, as illustrated in FIG. 6C, the upper electrode layer 39 under the non-element region 41 which is on the outside of the other end of the piezoelectric element 32 is removed by the etching, and the etching is continuously performed even after the removal of the upper electrode layer 39 under the non-element region 41, thereby removing the piezoelectric layer 38 under the non-element region 41 by 50 nm or less. Then, the resistant layer 46 is peeled off after the etching step, as illustrated in FIG. 6D. Accordingly, it is possible to manufacture, at a high yield rate, a highly reliable piezoelectric element 32 in which damage to the end of the upper electrode layer 39 is prevented while preventing the upper electrode layer 39 from remaining on the piezoelectric layer 38. That is, it is possible to efficiently manufacture the piezoelectric element 32 with improved reliability, thereby efficiently manufacturing the piezoelectric device 14 of improved reliability, eventually.

Once the piezoelectric element 32 is manufactured on the diaphragm 31, the sealing plate 33 is bonded onto the diaphragm 31 in a state where the piezoelectric element 32 is housed in the piezoelectric element housing space 34. Lastly, in a pressure chamber forming step, the pressure chamber 30 is formed in a lower surface (surface on a side to which the communication substrate 24 is connected) of the silicon single crystal substrate that will become the pressure chamber formation substrate 29. For example, the pressure chamber 30 is formed by etching the lower surface of the silicon single crystal substrate which will become the pressure chamber formation substrate 29. Accordingly, the piezoelectric device 14 illustrated in FIG. 2 and the like are manufactured.

The piezoelectric device 14 manufactured in such a manner is bonded onto the upper surface of the flow path unit 15 (communication substrate 24). Herein, the flow path unit 15 is manufactured through a communication substrate forming step in which a flow path, such as the common liquid chamber 25 and the like, is formed in a substrate (for example, a silicon single crystal substrate) that will become the communication substrate 24, a nozzle plate forming step in which the nozzles 22 that communicate with the pressure chambers 30 are formed in a substrate (for example, a silicon single crystal substrate) that will become the nozzle plate 21, and a flow path unit plate forming step in which the flow path unit 15 is formed by both of the substrates being adhered to each other. Once the piezoelectric device 14 is connected to the flow path unit 15, the head case 16 is connected to the flow path unit 15 in a state where the piezoelectric device 14 is housed in the housing space 17 of the head case 16. Accordingly, the recording head 3 illustrated in FIG. 2 is manufactured.

In the embodiment described above, the one end of the piezoelectric element 32 in the direction orthogonal to the nozzle column direction is defined by the one end of the lower electrode layer 37. Without being limited thereto, however, it is possible to adopt a configuration in which the one end of the piezoelectric element 32 is defined by the one end of the upper electrode layer 39. That is, it is possible to adopt a configuration in which the one end of the piezoelectric element 32 is defined by the one end of the upper electrode layer 39 which is formed on the inside of the one end of the lower electrode layer 37. Even in this case, it is preferable to etch the piezoelectric layer under the non-element region which is in the outside of the one end of the piezoelectric element by 50 nm or less. In addition, in the embodiment described above, dry etching is performed in the etching step. Without being limited thereto, however, it is possible to etch the upper electrode layer 39 and the piezoelectric layer 38 by wet etching.

Hereinbefore, as an example of a type of the electronic device, the piezoelectric device 14 provided with the piezoelectric element that is assembled into the recording head 3 has been described. However, the invention can be provided in and applied to other electronic devices insofar as the electronic device includes a capacitor that has an insulating layer which is interposed between the first electrode layer and the second electrode layer. That is, damage to a boundary between a capacitor and a non-element region of an electronic device can be prevented even if the electronic device has an over-etched non-element region which is on the outside of an end of the capacitor defined by one end of the upper electrode layer 39.

In addition to the piezoelectric device assembled into the recording head, the invention can be applied to a piezoelectric device in which the piezoelectric element functions as a sensor. In addition to the liquid ejecting head, the invention can also be applied, for example, to a colorant discharging head that is used in manufacturing color filters, such as a liquid crystal display, an electrode material discharging head that is used in forming electrodes, such as an organic electroluminescent (EL) display, a field emission display (FED) and the like, a bioorganic material discharging head that is used in manufacturing biochips (biochemical elements), or the like.

What is claimed is:

1. A piezoelectric device comprising:
a diaphragm; and
a plurality of piezoelectric elements,
wherein each one of the plurality of piezoelectric elements is configured with a first electrode layer, a first piezoelectric layer, and a second electrode layer being stacked on the diaphragm in the order listed herein,
wherein the first electrode layer is formed to be common for the plurality of piezoelectric elements and the second electrode layer is formed individually for each of the plurality of piezoelectric elements,
wherein the piezoelectric element is defined by a region where the first electrode, the piezoelectric layer and the second electrode layer are stacked, wherein the piezoelectric layer is provided so as to extend to a non-element region that is outside of the piezoelectric element, wherein the piezoelectric layer of the non-element region is formed thinner than the piezoelectric layer of the piezoelectric element in a direction intersectional to a direction which the plurality of piezoelectric elements are arranged, wherein a damaged layer is formed on a surface of the piezoelectric layer of the non-element region, and wherein a thickness of the damaged layer is equal to or less than 30 nm.

2. The piezoelectric device according to claim 1, wherein the damaged layer is amorphous.

3. The piezoelectric device according to claim 1, wherein, in the direction intersectional to the direction which the plurality of piezoelectric elements are arranged, a boundary of the piezoelectric layer of the non-element region, which is on the piezoelectric element side, is in a state of being sloped from the piezoelectric element.

4. A liquid ejecting head comprising:
the piezoelectric device according to claim 1;
a pressure chamber of which a volume is changed, following deformation of the piezoelectric element; and
a nozzle that communicates with the pressure chamber.

5. A manufacturing method for a piezoelectric device including a diaphragm, and a plurality of piezoelectric elements, wherein each one of the plurality of piezoelectric elements is configured with a first electrode layer, a piezoelectric layer, and a second electrode layer being stacked on the diaphragm in the order listed herein, the manufacturing method for the piezoelectric device comprising:

etching the second electrode layer to remove the second electrode layer and, in a direction intersectional to a direction which the plurality of piezoelectric elements are arranged, continuously etching the piezoelectric layer in a non-element region that is outside of a piezoelectric element defined by a region where the first electrode, the piezoelectric layer and the second electrode layer are stacked, such that a damaged layer of which a thickness is equal to or less than 30 nm is formed on a surface of the piezoelectric layer of the non-element region wherein the first electrode layer is formed to be common for the plurality of piezoelectric elements and the second electrode layer is formed individually for each of the plurality of piezoelectric elements.

6. The manufacturing method for the piezoelectric device according to claim 5, wherein the damaged layer is amorphous.

7. The manufacturing method for the piezoelectric device according to claim 5, wherein, in a direction intersectional to a direction which the plurality of piezoelectric elements are arranged, a slope from the piezoelectric element is formed in a boundary of the piezoelectric layer of the non-element region, which is on the piezoelectric element side, by the etching.

8. A manufacturing method for a liquid ejecting head comprising:
the manufacturing method for the piezoelectric device according to claim 5;
forming a pressure chamber of which a volume is changed, following deformation of the piezoelectric element; and
forming a nozzle plate where a nozzle that communicates with the pressure chamber is formed.

* * * * *